United States Patent [19]

Okano et al.

[11] Patent Number: 5,474,825
[45] Date of Patent: Dec. 12, 1995

[54] OPTICAL RECORDING MEDIUM

[75] Inventors: Makoto Okano; Shingo Iwasaki; Toshiyuki Miyadera; Fumio Matsui, all of Saitama, Japan

[73] Assignee: Pioneer Electric Corporation, Tokyo, Japan

[21] Appl. No.: 145,632

[22] Filed: Nov. 4, 1993

[30] Foreign Application Priority Data

Nov. 10, 1992 [JP] Japan ................. 4-299393

[51] Int. Cl.⁶ ........................................... B32B 3/00
[52] U.S. Cl. ..................... 428/64.8; 428/333; 428/913; 430/270; 430/495; 430/945
[58] Field of Search ..................... 428/64, 65, 333, 428/913; 430/945, 270, 495

[56] References Cited

U.S. PATENT DOCUMENTS 4,990,388  2/1991  Hamada et al. ................. 428/64
5,161,150  11/1992  Namba et al. ................. 369/275.4

Primary Examiner—B. Hamilton Hess
Attorney, Agent, or Firm—Nikaido, Marmelstein, Murray & Oram

[57] ABSTRACT

An optical recording medium has a substrate, a recording film of phthalocyanine coloring matter and provided on the substrate, a light reflection film on the recording film, and a protection film on the light reflection film. The light reflection film is made of Au and has a thickness less than 1500 Å.

4 Claims, 2 Drawing Sheets

LASER BEAM

LASER BEAM

OPTICAL RECORDING MEDIUM

BACKGROUND OF THE INVENTION

The present invention relates to an optical recording medium such as a writable disc and readable disc, and more particularly to a recording medium which has a recording film containing coloring matter of phthalocyanine.

In a recording film of a rewritable optical recording medium, it is well known to use organic coloring matter such as cyanine or phthalocyanine.

As a method for writing information on the recording medium, a laser beam is focused on the recording film at a small area and converted into thermal energy so that the characteristic of the recording film is changed to form a pit. In order to properly change the characteristic of the recording film, two sheets of the recording mediums comprising a substrate and a record film coated on the substrate is prepared. The recording films are disposed opposite to each other, interposing air therebetween, so called air sandwich construction.

A transparent substrate is irradiated with a laser beam for writing information and the pit is formed on the recording film. A laser beam for reading the recorded information has a rather weak power compared with the writing laser beam. The contrast between the pit and the area other than the pit is detected as an electric signal.

Besides the above mentioned recording medium, a recording medium on which information has been already recorded is provided. It is a read only memory (ROM) type recording medium which is widely used in the sound recording field and information processing field. In such a recording medium, it is not necessary to provide the writable recording film and prepits corresponding data to be reproduced are previously formed on a plastic substrate by press. A metallic reflection film made of Au, Ag, Cu, or Al is coated on the substrate and a protection film is covered on the reflection film. The most typical example thereof is a compact disc (CD). The format of writing and reading signal of the CD is standardized and the reproducing device of the CD is widely used as a CD player.

Since the rewritable recording medium uses a laser beam and is in the form of a disc, it is the same as the CD. Therefore, it has developed to adapt the recording medium to be played by the CD player.

The recording medium comprises a light-transmissible substrate, a recording film made of organic coloring matter and coated on the substrate, a light reflection film coated the recording film, and a protection film covered on the reflection film.

When using, the recording medium is reproduced by a CD player mounted on a car. Therefore, it is desirable that the recording medium has high resistances to light and environmental conditions. For such a use, it has been found that the phthalocyanine coloring matter is more effective for the recording film than the cyanine coloring matter.

In the recording medium having the recording film of phthalocyanine, a light reflection film made of Au is coated on the recording film. If the thickness of the reflection film is large, recording sensitivity is reduced and a hump is generated in a waveform of a reproduced signal.

SUMMARY OF THE INVENTION

An object of the present invention is to provide an optical recording medium in which recording sensitivity is improved, and the hump of a reproduced signal is prevented.

Another object of the invention is to provide a recording medium which has high resistance to light and environmental conditions.

According to the present invention, there is provided an optical recording medium having a substrate, a recording film of phthalocyanine coloring matter provided on the substrate, a light reflection film on the recording film, and a protection film on the light reflection film. The light reflection film is made of Au and has a thickness less than 1500 Å.

The other objects and features of this invention will become understood from the following description with reference to the accompanying drawings.

DETAILED DESCRIPTION OF THE PREFERRED EMBODIMENT

Figure 1:
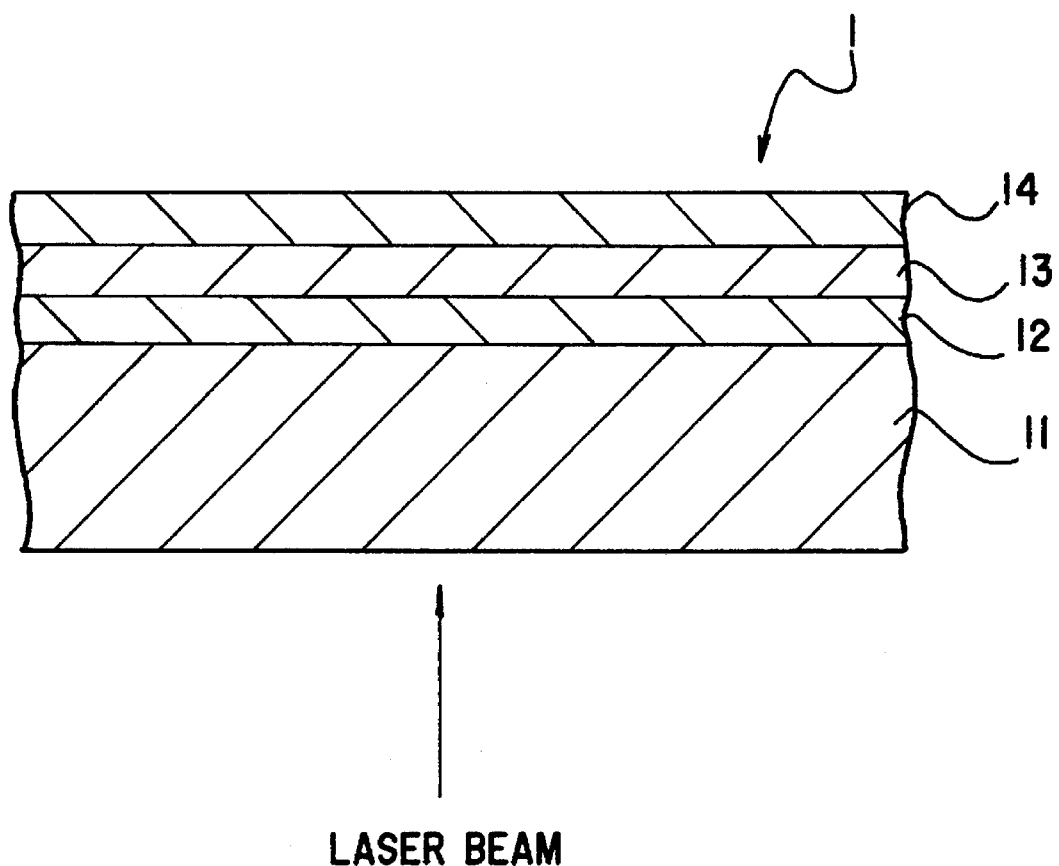
FIG. 1 is an enlarged sectional view partly showing an optical recording medium according to the present invention.

Referring to FIG. 1 showing an optical recording medium of the present invention, in the embodiment of the present invention, a writable optical disc conformable to the format of the CD will be described. An optical recording medium 1 comprises a light-transmissible substrate 11 in the form of a disc, a recording film 12 coated on the substrate 11, a reflection film 13 coated on the recording film 12, and a protection film 14 covering the reflection film 13.

The substrate 11 is made of transparent material such as polycarbonate (PC) resin or polymethylmethacrylate (PMMA) resin and formed by injection molding in consideration of productivity. A coaxial tracking pregroove or a spiral tracking pregroove is formed on the substrate 11 at the underside.

Alternatively, the substrate may be formed by the photo-Polymer method. The thickness of the substrate 11 is about 1.0 to 1.5 mm.

The recording film 12 coated on the substrate 11 contains organic coloring matter, for example, phthalocyanine coloring matter. The phthalocyanine coloring matter is represented by the general formula [1] as follows.

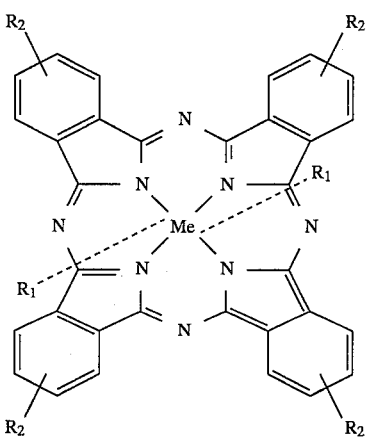

wherein $R^1$ is selected from alkyl group which may have a substituent, hydrogen atom, halogen atom, hydroxyl group, $-OR^{15}$, $-SR^{15}$, $-SeR^{15}$, $-TeR^{15}$,

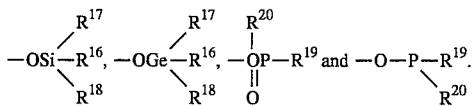

$R^{15}$ is selected from alkyl group which may have a substituent, aryl group which may have a substituent, cycloalkyl group which may have a substituent, and polyether group.

$R^{16}$, $R^{17}$, and $R^{18}$ may be either the same or the difference and are selected from alkyl group which may have a substituent, cycloalkyl group which may have a substituent, aryl group which may have a substituent, alkoxy group which may have a substituent, aryloxy group which may have a substituent, polyether group, hydroxyl group, and hydrogen atom.

$R^{19}$ and $R^{20}$ may be either the same or the difference and are selected from alkyl group which may have a substituent, cycloalkyl group which may have a substituent, and aryl group which may have a substituent.

$R_2$ is selected from alkyl group which may have a substituent independently, alkoxy group which may have a substituent, heterocyclic residue which may have a substituent, halogen atom, nitro group, cyano group, or sulfonic group.

Me is a metal. Particularly, Si, V, Fe or Al is preferable.

The recording film 12 containing such coloring matter is dissolved by a solvent and coated on the substrate 11 by a normal method such as spin coating so that the recording film 12 is formed.

The solvent is selected from such a material, for example, deacetone alcohol, ethyl cellosolve, methyl cellosolve, isophorone, methanol, or tetrafluoropropanol.

The thickness of the film is about 10 to 1000 nm, preferably 100 to 500 nm. If the thickness is less than 10 nm, the recording film lacks recording sensitivity. If the thickness exceeds 1000 nm, reflectance becomes insufficient.

The reflection film 13 coated on the recording film 12 is made of Au, and coated by vacuum deposition, cathode sputtering, or ion plating. The thickness of the film 13 is less than 1500 Å, preferably 400 Å to 1500 Å. If the thickness exceeds 1500 Å, the recording sensitivity is reduced and a remarkable hump is generated in a waveform of a reproduced signal.

As the protection film 14 for protecting films 12 and 13, a resin hardened by ultraviolet ray is used and covered by spin coating. Alternatively, epoxy resin, acrylic resin, silicon or urethane resin is used. The thickness of the film 14 is determined for preventing the reflection film 13 from deteriorating when the pits are formed on the recording film 12. Namely, the reflection film 13 may deform toward the protection film 14 when pits are formed on the film 12. If such a deformation exists, it is impossible to normally reproduce the signal.

Therefore, the thickness of the protection film 14 is more than 2.5 μm, preferably more than 3.0 μm. However, if the film 14 is made of the resin of a type hardened by the ultraviolet ray, the thickness is preferably less than 50 μm. If the thickness is excessively large, the film is not effectively hardened by the ultraviolet ray.

A top coat film made of organic material may be provided on the substrate 11 opposite to the recording film 12 for adjusting reflectance. An interlayer such as a protection film for protecting the substrate 11 from solvent may be provided between the substrate 11 and the recording film 12.

In operation, the disc is rotated and the irradiated with a laser beam in the form of pulses. A part of the recording film is melted and removed so that pits are formed. The pits are irradiated with the laser beam at the reproduction of the disc and read by detecting the difference between the injected light and the reflected light.

The present invention will be described in detail with reference to an example.

EXAMPLE

Phthalocyanine coloring matter specified by the following formula is melted in the solvent of ethyl cellosolve to make a solution for the recording film. The solution is coated on the substrate 11 which is made of polycarbonate having 120 mm in diameter and 1.2 mm in thickness by spin coating to the thickness about 2000 Å that the recording film 12 is formed.

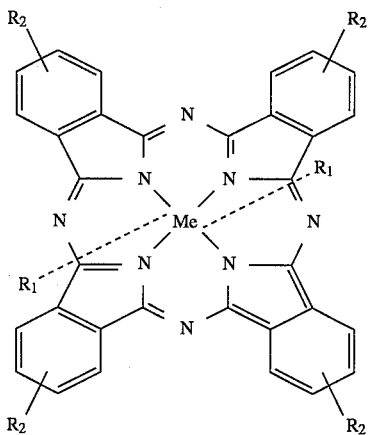

-continued

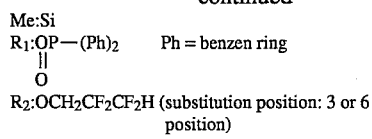

$R_2$:OCH$_2$CF$_2$CF$_2$H (substitution position: 3 or 6 position)

The reflection film 13 made of Au is coated at the thickness 500 Å by vacuum deposition of resistor heating type. The protection film 14 made of ultraviolet ray hardening acrylate resin is covered at the thickness about 5 μm.

Test

In the example, an EFM signal is recorded under recording conditions as follows.

L.V.=1.4 m/s, λ=785 nm, N.A.=0.5, and recording power of the laser beam=8.0 mW.

Thereafter, the signal is reproduced under reproducing conditions as follows.

L.V.=1.4 m/s, λ=783 nm, N.A. =0.45, and reproducing power of the laser beam =0.3 mW.

Figure 2:
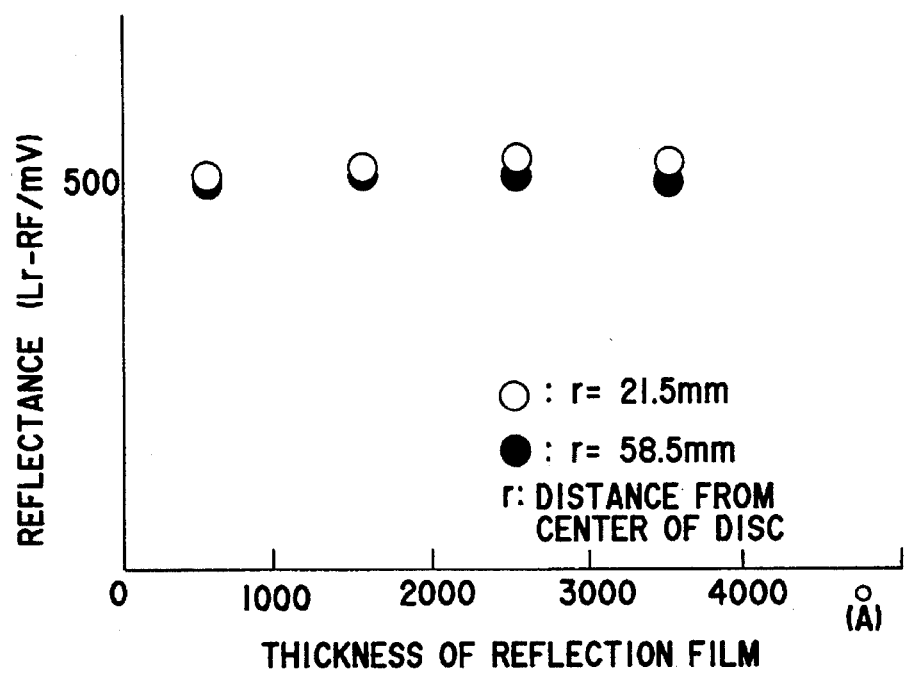
FIG. 2 is a diagram showing a relationship between thickness and reflectance of a light reflection film.
Figure 3:
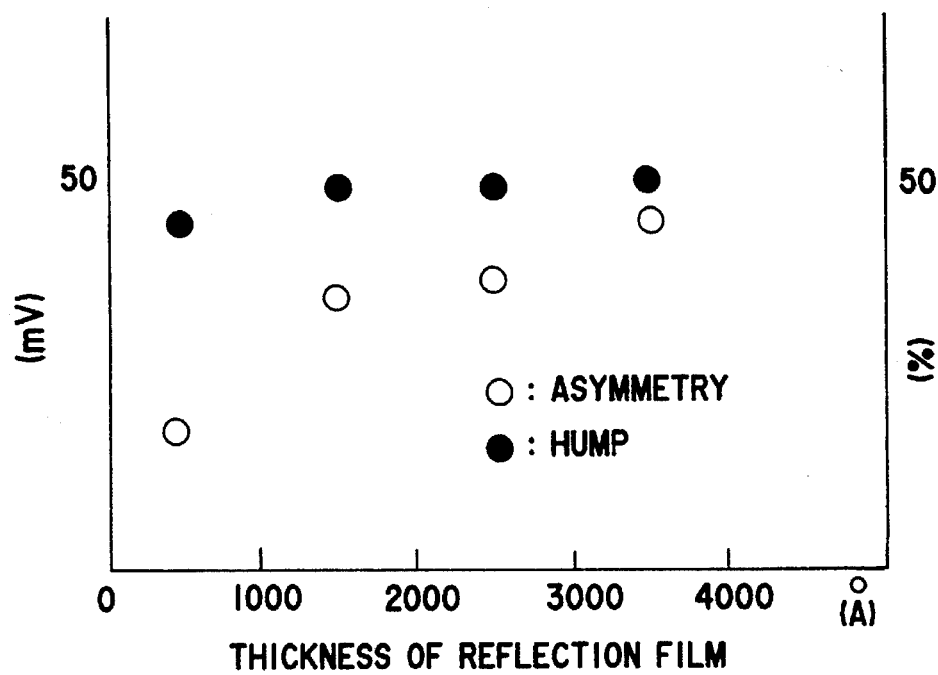
FIG. 3 is a diagram showing a relationship between the thickness of the reflection film and hump and asymmetry of a reproduced signal.

Relationships between thickness and reflectance of the reflection film and between the thickness of the reflection film and hump in a waveform and asymmetry in eye pattern of a reproduced signal are estimated. FIGS. 2 and 3 show the respective results.

The value of asymmetry Av of the reproduced signal is calculated by an equation as follows.

$$Av=[(I_{3t}+I_{3b})-2I_{11b})/2(I_{11t}-I_{11b})]\times100\ (\%)$$

where $I_{3t}$: bright level of the 3T signal, which is the shortest pit, in an EFM signal $I_{3b}$: dark level of the 3T signal $I_{11t}$: bright level of the 11T signal, which is the longest pit, in the EFM signal $I_{11b}$: dark level of the 11T signal If the same recording power is used, when the asymmetry value is small, the recording sensitivity is high.

EXAMPLES 2 TO 4

The thickness of the reflection film 13 is changed to 1500 Å, 2500 Å and 3500 Å. The results are also shown in FIGS. 2 and 3. Other conditions of the recording medium are the same as the first example.

Results

As shown in FIG. 2, it is determined even if the reflection film is less than 1500 Å, a sufficient reflectance is obtained. As shown in FIG. 3, if the thickness exceeds 1500 Å, the recording sensitivity is reduced and the hump of the signal is remarkably generated.

In accordance with the present invention, the light reflection film is formed less than 1500 Å in thickness. Thus, the recording sensitivity of the recording medium is improved and the hump of the reproduced signal is prevented. The recording medium having high resistances to light and environmental condition is provided.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In an optical recording medium comprising a substrate, a recording film of phthalocyanine coloring matter provided on the substrate, a light reflection film on the recording film, and a protection film on the light reflection film, the improvement which comprises:

said phthalocyanine coloring matter being represented following general formula:

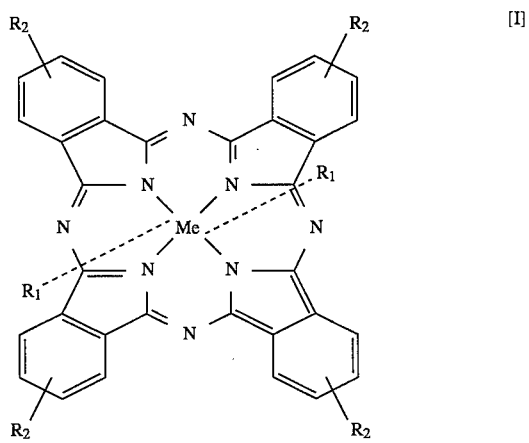

wherein: $R_1$ is at least one member selected from the group consisting of an alkyl group and an alkyl group substituted with at least one member selected from the group consisting of a halogen atom, a hydroxyl group, —OR$^{15}$, —SR$^{15}$, —Se$^{15}$, —Te$^{15}$,

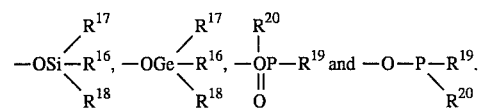

$R^{15}$ is at least one member selected from the group consisting of an alkyl group, a substituted alkyl group, an aryl group, a substituted aryl group, a cycloalkyl group, a substituted cycloalkyl group, and a polyether group;

$R^{16}$, $R^{17}$, and $R^{18}$ may be either the same or different and are each selected from at least one member selected from the group consisting of an alkyl group, a substituted alkyl group, a cycloalkyl group, a substituted cycloalkyl group, and aryl group, a substituted aryl group, an alkoxy group, a substituted alkoxy group, an aryloxy group, a substituted aryloxy group, a polyether group, and a hydroxyl group;

$R^{19}$ and $R^{20}$ may be either the same or different and are at least one member selected from the group consisting of an alkyl group, a substituted alkyl group, a cycloalkyl group, a substituted cycloalkyl group, an aryl group, and a substituted aryl group;

$R_2$ is at least one member selected from the group consisting of an alkyl group, a substituted alkyl group, an alkoxy group, a substituted alkoxy group, a residue of a heterocyclic compound, a substituted residue of a heterocyclic compound, a halogen atom, a nitro group, a cyano group, and a sulfonic acid group; and Me is a metal; and wherein the light reflection film is Au having a thickness less than 1500 Å.

2. The improved optical recording medium according to claim 1 wherein:

the thickness of said light reflection film is between 400 Å and 1500 Å.

3. The improved optical recording medium according to claim 1 wherein said Me is a member selected from the group consisting of Si, V, Fe and Al.

4. An optical recording medium as claimed in claim 1 wherein said phthalocyanine coloring matter is represented by the formula:

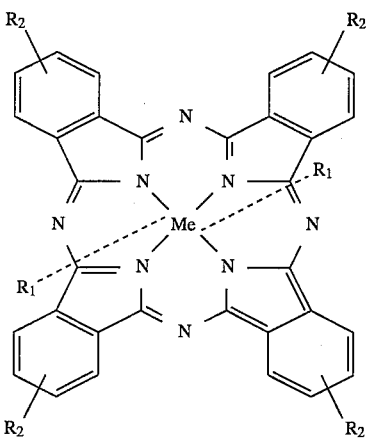

wherein Me is Si, $R_1$ is $\overset{O}{\underset{\|}{OP}}$—$(Ph)_2$, where Ph is a benzene ring, and $R_2$ is $OCH_2CF_2CF_2H$.

* * * * *

UNITED STATES PATENT AND TRADEMARK OFFICE
CERTIFICATE OF CORRECTION

PATENT NO. : 5,474,825
DATED : December 12, 1995
INVENTOR(S) : Makoto Okano, et. al.

It is certified that error appears in the above-identified patent and that said Letters Patent is hereby corrected as shown below:

Title page, item [73], Assignee: should read-- Pioneer Electronic Corporation--

Signed and Sealed this

Thirtieth Day of April, 1996

*Attest:*

BRUCE LEHMAN

*Attesting Officer*  *Commissioner of Patents and Trademarks*